United States Patent [19]
Platte

[11] 3,732,540
[45] May 8, 1973

[54] EMERGENCY WARNING LIGHT SWITCHING SYSTEM

[76] Inventor: Robert F. Platte, 810 Kay Court, Laurel, Md. 20810

[22] Filed: Nov. 16, 1970

[21] Appl. No.: 89,562

[52] U.S. Cl. .................340/76, 315/82, 340/83
[51] Int. Cl. ..............................B60q 1/46
[58] Field of Search................340/76, 83, 331; 315/77, 82, 83, 322, 209; 307/210, 41

[56] References Cited

UNITED STATES PATENTS

| | | | |
|---|---|---|---|
| 3,153,733 | 10/1964 | De Bolt et al. | 307/41 X |
| 3,113,241 | 12/1963 | Yonushka | 340/83 UX |
| 3,376,472 | 4/1968 | Taylor et al. | 340/83 X |
| 3,391,304 | 7/1968 | Fabry | 340/83 X |
| 3,488,558 | 1/1970 | Grafton | 340/83 X |
| 2,932,814 | 4/1960 | Wilfert | 340/76 |
| 2,578,284 | 12/1951 | Bowman | 340/55 X |
| 2,655,642 | 10/1953 | Ayres et al. | 340/83 |
| 3,113,293 | 12/1963 | Breese et al. | 340/83 X |
| 3,500,315 | 3/1970 | Shimada | 340/82 |

Primary Examiner—John W. Caldwell
Assistant Examiner—Kenneth N. Leimer
Attorney—Craig, Antonelli & Hill

[57] ABSTRACT

An emergency warning light switching system for motor vehicles employs a solid state oscillator circuit which controls the alternate energization of vehicle lamps, such as, the vehicle headlamps. A unijunction transistor oscillator-bistable multivibrator arrangement supplies alternate pulses to a gate network. The pulses are amplified and alternately supplied to the vehicle lamps. An oscillator over-ride arrangement is provided, whereby the vehicle lamps may be energized simultaneously.

10 Claims, 1 Drawing Figure

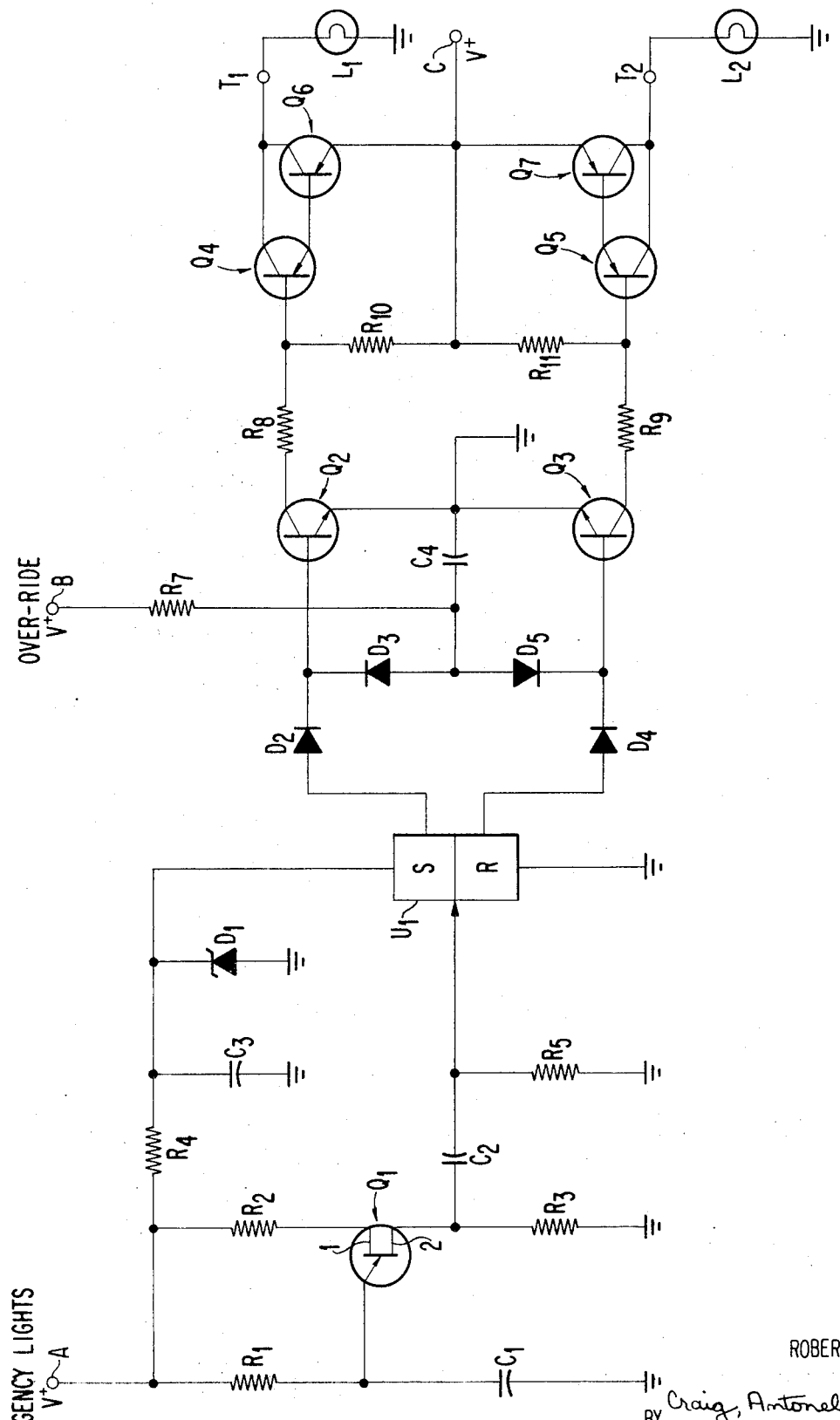

EMERGENCY WARNING LIGHT SWITCHING SYSTEM

This invention relates to emergency warning light systems for motor vehicles and, more particularly, to the alternate flashing of vehicle lamps, such as the vehicle headlamps, through the use of solid state electronic circuitry.

Various types of warning light systems have been employed in emergency vehicles and have generally included roof-mounted flashing lights. In order to distinguish certain vehicles such as police vehicles from other types of emergency vehicles, jurisdictions have adopted the use of roof-mounted, particularly dome-type, blue flashing lights in place of the common amber or red lights. However, it is difficult for the human eye to distinguish the color blue at a distance; also, human side vision is generally poor in distinguishing between colors.

To overcome the limitations of using the color blue in roof-mounted flashing light arrangements, while still distinguishing between emergency vehicles, it has been proposed to use vehicle lamps such as the headlamps, as the warning light system in place of or in addition to the roof-mounted lights. It has also been found that where the vehicle lamps, such as the headlamps, are of the type which emit a bright blue color, reflection of the bright blue light from metallic or mirrored surfaces of other vehicles provide other drivers with a very satisfactory warning of the approach of an emergency vehicle. This is particularly advantageous where the emergency vehicle is approaching from the rear, as the light reflecting from surfaces such as the rear view mirror, metallic interior surfaces, etc. warns the driver of the approach of the emergency vehicle. A roof-mounted dome-type light, on the other hand, is not readily detected by the driver.

BRIEF SUMMARY OF THE INVENTION

Briefly, the present invention is directed to a warning light system which employs solid state circuitry to control the alternate flashing of vehicle mounted lamps. A unijunction transistor oscillator delivers a series of pulses to a sequential logic circuit, such as a bistable flip-flop which has its set and reset outputs gated and amplified to the respective vehicle lamps. An over-ride is also provided to activate both lamps simultaneously, irrespective to the generation of flashing pulses by the oscillator.

It is, therefore, a primary object of the present invention to provide a new and improved emergency vehicle warning light system.

It is a further object of the present invention to provide a vehicle lamp switching system whereby vehicle-mounted lamps may be alternately flashed during an emergency and may also be connected for normal simultaneous use.

It is another object of the present invention to provide a vehicle emergency warning light switching system which employs solid state circuitry, to thereby avoid problems such as the sticking, wearing and bounce of movable contacts.

It is an additional object of the present invention to provide an emergency warning light system employing vehicle headlamps, having a high beam over-ride, thus making the system applicable to a two or four lamp system.

Other objects, features and many of the attendant advantages of this invention will be appreciated more readily as the same becomes understood by reference to the following detailed description, when considered in connection with the accompanying drawing, wherein:

The FIGURE is a schematic diagram of the emergency warning light switching system of the present invention.

In the FIGURE, a first terminal A, to which a voltage is supplied for actuating vehicle lamps, in an emergency flashing condition, is connected to resistors $R_1$, $R_2$ and $R_4$. Resistors $R_1$ and $R_2$ are connected to the emitter and base 1, respectively, of unijunction transistor $Q_1$. Connected between ground and the emitter and the other base 2 of transistor $Q_1$ are a capacitor $C_1$ and a resistor $R_3$, respectively. Together, transistor $Q_1$ and elements $R_1$, $R_2$ and $R_3$ and $C_1$ form a relaxation oscillator which produces pulses at a preferred rate of approximately two per second.

The output of transistor $Q_1$ is coupled across resistor $R_3$ and is supplied via capacitor $C_2$ to the toggle input of flip-flop $U_1$. A resistor $R_5$ is connected between ground and capacitor $C_2$ to discharge the latter. Flip-flop $U_1$ is preferably an integrated circuit bi-stable, toggle flip-flop producing symmetrical square wave outputs at its "Set" and "Reset" outputs, with half periods equal to the period between pulses fed to the toggle input of flip-flop $U_1$.

Also connected to flip-flop $U_1$ are resistor $R_4$ capacitor $C_3$ and diode $D_1$ which forms a by-pass bias center for the flip-flop $U_1$.

Connected to the respective "Set" and "Reset" outputs of flip-flop $U_1$ are diodes $D_2$ and $D_4$. These diodes, together with diodes $D_3$ and $D_5$ and transistors $Q_2$ and $Q_3$, respectively, form two-two input positive "NOR" gates. Capacitor $C_4$, which has one side thereof grounded, and resistor $R_7$ are connected to the common junction of diode $D_3$ and $D_5$. Via resistor $R_7$ a positive voltage is supplied from terminal B.

The emitters of the symmetrically connected transistors $Q_2$ and $Q_3$ are grounded while their respective collectors are connected through resistors $R_8$ and $R_9$ to the bases of transistors $Q_4$ and $Q_5$. Transistors $Q_4$ and $Q_5$, together with associated transistors $Q_6$ and $Q_7$, form Darlington coupled amplifiers. Resistors $R_{10}$ and $R_{11}$ are connected to resistors $R_8$ and $R_9$ and to the emitters of transistors $Q_6$ and $Q_7$, respectively. The common connection of resistors $R_{10}$, $R_{11}$ and the emitters of transistors $Q_6$ and $Q_7$ is connected to a terminal C to which a positive voltage is applied. Resistor pairs $R_8 - R_{10}$ and $R_9 - R_{11}$ function as collector loads for transistors $Q_2$ and $Q_3$ and bias resistors for the Darlington amplifiers $Q_4$–$Q_6$ and $Q_5$–$Q_7$. The outputs of the Darlington amplifiers are connected to load terminals $T_1$ and $T_2$ which, in turn, may be connected to the vehicle lamps $L_1$ and $L_2$, respectively.

The operation of the circuit of the present invention has three separate modes, each of which will be described below.

Mode 1 — Emergency Lights Only

With terminal B open, a voltage of + 10 to + 15 volts is applied to terminals A and C. Capacitor $C_1$ charges through resistor $R_1$ until the voltage across capacitor $C_1$ exceeds the firing threshold voltage of transistor $Q_1$ at which time transistor $Q_1$ fires, discharging capacitor $C_1$ through the emitter-base 2 junction of transistor $Q_1$ and through resistor $R_3$. The discharge current produces, across resistor $R_3$, a positive voltage pulse which is capacitively coupled to the clock or toggle input of flip-flop $U_1$. Between pulses, resistor $R_5$ discharges capacitor $C_2$. As transistor $Q_1$ produces a chain of positive pulses, which are coupled to flip-flop $U_1$, flip-flop $U_1$ generates square waves at half the clock frequency provided by transistor $Q_1$.

Diodes $D_2$ and $D_4$ couple alternative positive signals to transistors $Q_2$ and $Q_3$. Since terminal B is open, no positive bias is simultaneously applied to the bases of transistors $Q_2$ and $Q_3$ through diodes $D_3$ and $D_5$, so that transistors $Q_2$ and $Q_3$ are driven alternately into saturation for an equal duration according to the frequency of the output of transistor $Q_1$. The outputs of transistors $Q_2$ and $Q_3$ are amplified by the subsequent Darlington amplifier stages, while operating in the saturation state once triggered on. When either transistor $Q_6$ or $Q_7$ saturates, energizing current is delivered to one of the lamps $L_1$ and $L_2$ through terminals $T_1$ and $T_2$, respectively. In this manner, each of the lamps is alternately energized at a frequency determined by the unijunction transistor oscillator and flip-flop $U_1$.

Mode 2 Over-ride

With voltage applied to terminals A and C as in Mode 1, a similar voltage of +10 to +15 volts is applied to terminal B. A positive bias is applied through diode $D_3$ and $D_5$ to transistors $Q_2$ and $Q_3$, irrespective of the operation of the oscillator circuit. As a result, transistors $Q_2$ through $Q_7$ are saturated and current is delivered to lamps $L_1$ and $L_2$ simultaneously. Thus, the flashing of the lamps is over-riden by the application of a voltage to terminal B.

Mode 3 Independent Operation

With voltage applied to terminals B and C only, the lamps operate in a standard simultaneous mode. Thus, the lamps can be energized independently of the generation of pulses by the oscillator circuit. This is particularly desirable where the vehicle headlamps are used. The circuit operates substantially in the same manner as in Mode 2, except that no pulses are delivered to diodes $D_2$ and $D_4$.

In Modes 2 and 3, the use of the logic gate arrangement permits over-ride thus making the circuit of the present invention applicable to two or four lamp systems.

From the foregoing description, it can be appreciated that the invention provides a new and improved energizing light switching system. Because the circuit is all solid state, the inherent defects of moving contacts, including wear and noise are eliminated. Furthermore, the term vehicle as used herein is not restricted to automobiles but may refer to other types of vehicles such as aircraft, boats, etc., as the warning system of the present invention is readily usable therein.

Having thus described the emergency light switching system of the present invention, it is believed obvious that other modifications and variations of the invention are possible in the light of the above teachings. It is, therefore, to be understood that changes may be made in a particular circuit of the invention described which are in the full intended scope of the invention as defined by the appended claims.

I claim:

1. In an emergency warning light switching system for motor vehicles, employing the vehicle head lamps for the warning lights, the improvement comprising:
   first means for generating a series of energizing pulses;
   second means, responsive to the pulses generated by said first means, for delivering said energizing pulses alternately to said vehicle headlamps, said second means including a first logic gate circuit and a pair of amplifiers coupled in series with said logic gate circuit for delivering alternate amplified pulses to said headlamps; and
   third means connected to said first logic gate circuit, for simultaneously energizing said headlamps irrespective of the application of said energizing pulses to said headlamps, so as to provide an emergency light over-ride to said lamps, wherein said simultaneous energizing third means comprises a second logic gate circuit connected to said first logic gate circuit, and means for delivering a supply voltage to said second logic circuit, whereby the application of an energizing signal to one of said first and second logic circuits will energize said headlamps.

2. An emergency warning light switching system according to claim 1, wherein said pulse generating means comprises a unijunction transistor oscillator and said second means further includes a bistable flip-flop connected in series with said unijunction transistor oscillator, and further including means for delivering an energizing voltage to said oscillator and to said flip-flop, the output of said flip-flop being coupled to said pulse delivering amplifiers.

3. An emergency warning light system according to claim 2, wherein said first logic gate circuit includes first and second diodes connected to the respective outputs of said flip-flop and further including first and second symmetrically arranged transistors connected between said diodes and said amplifiers, for amplifying the output of said diodes.

4. An emergency warning light system according to claim 3, wherein said second logic gate circuit includes third and fourth diodes connected to said first and second transistors for delivering an over-ride signal to said transistors irrespective of the application of alternate pulses thereto from said first and second diodes.

5. An emergency warning light system according to claim 4, wherein each amplifier in said pair of amplifiers comprises a Darlington connected amplifier.

6. An emergency warning light system according to claim 5, further including a differentiator network connected between the output of said unijunction transistor oscillator and the input of said flip-flop.

7. An emergency warning light system according to claim 6, further including a by-pass bias network connected between said energizing voltage delivering means and said flip-flop.

8. An emergency warning light switching system for a motor vehicle, particularly one employing the vehicle headlamps for the warning lights, comprising:
   first means for generating a series of pulses;

second means, having a pair of outputs and having an input connected to receive said pulses generated by said first means, for providing a series of alternate energizing pulses at said pair of outputs in response to the pulses generated by said first means;

third means, having a pair of inputs, which are separately connected to the outputs of said second means, for delivering alternate ones of said energizing pulses to a pair of lamp terminals for alternately energizing lamps connected thereto; and fourth means, connected to both inputs of said third means, for supplying an over-ride input signal to each input of said third means, to provide an energizing signal to both lamp terminals, irrespective of the generation of pulses by said first means, wherein said first means comprises a transistor oscillator circuit, said second means comprises a bistable element, connected to said transistor oscillator, for providing said series of alternate energizing pulses at the pair of outputs thereof, said third means comprises a first logic circuit and a pair of amplifier circuits coupled in series with said first logic circuit, and wherein said fourth means comprises a second logic circuit connected to said first logic circuit, and means for delivering a supply voltage to said second logic circuit, whereby the application of an energizing signal to one of said first and second logic circuits will energize said headlamps.

9. An emergency warning light switching system according to claim 8, wherein said first logic circuit includes first and second diodes connected to the respective outputs of said bistable element and further includes first and second symmetrically arranged transistors connected between said diodes and said amplifiers for amplifying the output of said diodes.

10. An emergency warning light switching system according to claim 9, wherein said second logic circuit includes third and fourth diodes connected to said first and second transistors for delivering an over-ride signal to said transistors irrespective of the application of alternate pulses thereto from said first and second diodes.

* * * * *